US005159879A

United States Patent [19]

Urabe et al.

[11] Patent Number: 5,159,879

[45] Date of Patent: Nov. 3, 1992

[54] PLATE SURFACE CORRECTING SOLUTION FOR DRY LITHOGRAPHIC PRINTING PLATE

[75] Inventors: Yoshihiko Urabe, Haibara; Toshio Ohba, Annaka, both of Japan

[73] Assignees: Fuji Photo Film Co., Ltd., Tokyo; Shin-Etsu Chemical Co., Ltd., Gunma, both of Japan

[21] Appl. No.: 782,972

[22] Filed: Oct. 23, 1991

[30] Foreign Application Priority Data

Oct. 26, 1990 [JP] Japan .................................. 2-289489

[51] Int. Cl.[5] .......................... B41C 1/10; B32B 35/00

[52] U.S. Cl. .................................... 101/465; 427/140

[58] Field of Search ..................... 101/463.1, 465, 466, 101/478, 483, 494, 450.1; 427/140, 142; 430/309, 303

[56] References Cited

U.S. PATENT DOCUMENTS 3,276,361 10/1966 Abbott et al. ........................ 101/466
3,922,171 11/1975 Palmer ............................ 427/140 X
4,396,703 8/1983 Matsumoto et al. ........... 101/465 X
4,717,583 1/1988 McKissick ...................... 101/466 X

FOREIGN PATENT DOCUMENTS 0022203 2/1979 Japan .................................. 101/465
0013447 1/1982 Japan .................................. 101/465
176043 10/1982 Japan .
102235 6/1983 Japan .
144170 6/1987 Japan .
2163056 7/1987 Japan .................................. 101/465
299854 12/1987 Japan .

*Primary Examiner*—Clifford D. Crowder
*Attorney, Agent, or Firm*—Sughrue, Mion, Zinn, Macpeak & Seas

[57] ABSTRACT

A process of correcting a dry lithographic printing plate which comprises applying to an unwanted area of an ink-accepting area in the dry lithographic printing plate consisting of ink-repellent areas comprising a silicone rubber layer and ink-accepting area, a correcting solution comprising the following components:

| | amount (parts by weight) |
|---|---|
| (a) Linear organopolysiloxane having three alkoxy groups at both terminal ends | 100 |
| (b) Titanium based condensation catalyst | 0.1 to 5 |
| (c) Organic solvent. | 100 to 5,000 |

The plate surface retouching solution provides a coating which has a good adhesion to a light-sensitive layer and a good resistance to printing.

5 Claims, No Drawings

PLATE SURFACE CORRECTING SOLUTION FOR DRY LITHOGRAPHIC PRINTING PLATE

BACKGROUND OF THE INVENTION

The present invention relates to a correcting solution for a dry lithographic printing plate in which a silicone rubber layer serves as an ink repellent layer.

There have been proposed a variety of dry lithographic printing plates in which a silicone rubber layer serves as an ink repellent layer. Among these, those which comprise a substrate having provided thereon, in order, a light-sensitive resin layer and a silicone rubber layer are typical ones and examples thereof are, for instance, these disclosed in Japanese Patent Publication for Opposition Purpose (hereunder referred to as "J. P. KOKOKU") Nos. Sho 54-26923 (U.S. Pat. No. 3,894,873), Sho 56-23150, Sho 55-22781 (British Pat. No. 1,419,643) and Japanese Patent Unexamined Publication (hereunder referred to as "J. P. KOKAI") No. Hei 2-226249.

These lithographic printing plates have many advantages since they do not require dampening water.

However, the silicone rubber layer is relatively liable to be damaged so that scratches will be made easily when the printing plate is handled.

There have been proposed some correcting solutions for dry lithographic printing paltes which may delete scratches and defects in the form of a pinhole and defects due to film edges, accordingly.

J. P. KOKOKU No. Sho 61-3417 describes a plate surface retouching solution comprising one pack hardening silicone rubber solution containing triacetoxysilane as a cross-linking agent. J. P. KOKAI No. Sho 62-299854 describes a plate surface correcting solution comprising one-pack hardening silicone rubber solution containing vinyloxysilane compound as a cross-linking agent.

The coating obtained by the conventional correcting solutions has insufficient adhesion to the surface of image portions and can not bear printing more than 50,000 sheets before beginning to peel off the coating from the plate surface when correcting solid image portions, though the strength and hardening rate of the coating reach an almost satisfiable level in view of the printing techniques.

As a general method for strengthening the adhesion to image portions, it is conceivable that an appropriate silane coupling agent should be added to the correcting solution. However, the addition of such silane coupling agent influences the whole cross-linking reaction to lower the hardening rate and/or to lower the coating strength. Accordingly, even though the adhesion is strengthened, it does not lead to the increase of the resistance to printing.

SUMMARY OF THE INVENTION

Accordingly, an object of the present invention is to provide an improved correcting solution for a dry lithographic printing plate which may adhere to image portions strictly and may provide a coating having a good resistance to printing.

The foregoing objects of the invention can effectively be achieved by providing a correcting solution for deleting an image portion to a non-image portion in a dry lithographic printing plate in which a silicone rubber layer serves as an ink repellent layer wherein the correcting solution is the silicone rubber solution having the following components.

| | amount (parts by weight) |
|---|---|
| (a) Linear organopolysiloxane having three alkoxy groups at both terminal ends | 100 |
| (b) Titanium based condensation catalyst | 0.1 to 5 |
| (c) Organic solvent | 100 to 5,000 |

DETAILED EXPLANATION OF THE INVENTION

The linear organopolysiloxane having three alkoxy groups at each of both terminal ends used as component(a) according to the present invention is represented by the following general formula (I);

$$(R^1O)_3Si-(OSi(R^2)_2)_n-OSi(OR^1)_3 \quad (I)$$

In the above formula, $R^1$ represents a methyl, ethyl or propyl group, preferably a methyl group in view of hardening property. $R^2$ represents a monovalent hydrocarbon group having 1 to 10 carbon atoms and include, for instance, an alkyl group such as a methyl, ethyl, propyl, butyl or hexyl group, an aryl group such as a phenyl group or an aralkyl group such as a β-phenyl ethyl or β-phenyl propyl group. $R^2$ is preferably a methyl group, because the component(a) in which $R^2$ represents a methyl group can be synthesized easily and has good repellency of printing ink. n is a number from 50 to 1000. If n is less than 50, the coating obtained tends to be made too hard and have a poor resistance to printing and ink repellency. If n exceeds 1000, the hardening property tends to be poor.

The titanium based condensation catalyst as component(b) according to the present invention includes tetrabutyl titanate, tetra 2-ethyl hexyl titanate, triethanolamine titanate and tetraisopropenyloxy titanate.

The titanium based catalyst has a better hardening property at room temperature and a better stability in a solution in combination with the component(a) as compared with the other tin, zinc or copper based catalysts. The amount of the component(b) used is 0.1 to 5.0 parts by weight per 100 parts by weight of the component(a). If the amount of the component(b) used is less than 0.1 parts by weight, the hardening property of the solution will be insufficient. If the amount of the component (b) exceeds 5 parts by weight, the storage stability of the solution will be made poor.

The type of the organic solvent as component(c) is not limited as long as the component(a) and component(b) can dissolve in it, but those which may evaporate rapidly and have a good wetting property to the plate surface are desirable.

Such organic solvents may include n-hexane, n-heptane, ethyl acetate, mineral spirits, toluene and xylene, etc. The amount of the organic solvent used to provide a good thickness of a coating is preferably 100 to 5000 parts by weight, more preferably 500 to 1000 parts by weight per 100 parts by weight of the component(a).

The correcting solution for a printing palte of the present invention can provide a coating which has a good adhesion to a light-sensitive layer and a good resistance to printing.

The correcting solution for a dry lithographic printing plate of the present invention will hereinafter be explained in more detail with reference to the following non-limitative working Examples and further the effects practically attained by the present invention will also be discussed in detail in comparison with comparative Examples.

EXAMPLE 1

The following composition for a primer layer was applied to the surface of a smooth aluminum plate which had been degreased in a usual manner so that the amount of the composition coated was 2.0 g/$m^2$ (on dry basis), and was heated to harden.

| Composition for Primer Layer | amount (parts by weight) |
|---|---|
| Epikote 1001 (made by Shell Chemical, Ltd. bisphenol A based epoxy resin, epoxy equivalent is 450 to 500) | 100 |
| Methyl tetrahydrophtalic acid anhydride | 36 |
| 2,4,6-tris(dimethylaminomethyl)phenol | 10 |
| Methyl cellosolve acetate | 600 |
| Toluene | 600 |
| Methyl ethyl ketone | 600 |

The following light-sensitive composition was applied to the surface of the primer layer provided on the aluminum plate so that the amount of light-sensitive composition coated was 0.25 g/$m^2$ (on dry basis), and dried.

| Light-sensitive Composition | amount (parts by weight) |
|---|---|
| Light-sensitive unsaturated polyester made by 1:1 polycondensation of p-phenylene diacrylic acid ester and 1,4-dihydroxy ethyloxycyclohexane | 10 |
| 1-methyl-2-benzoylmethylene-β-naphtothiazoline | 0.6 |
| Sumitone cyanine blue VH514 (made by Sumitomo Chemical, Ltd. phthalocyanine blue pigment) | 2 |
| Methyl cellosolve acetate | 600 |
| Toluene | 300 |

The following silicone rubber composition was then applied to the light-sensitive layer so that the amount of the silicone rubber composition coated was 2.0 g/$m^2$ (on dry basis), and dried to obtain a silicone rubber vulcanized layer.

| Silicone rubber composition | amount (parts by weight) |
|---|---|
| Dimethyl polysiloxane having OH groups at both terminal ends (M.W. is about 600,000) | 100 |
| Methylhydrogen polysiloxane having trimethylsilyl groups at both terminal ends (M.W. is about 2,500) | 3.5 |
| 1-Trimethoxy silylpropyl-3,5-diallylisocyanurate | 3.3 |
| Dibutyl tin dioctanoate | 3.3 |
| Isopar G (made by Esso Chemical, ltd.) | 2000 |

A single side matted polypropylene film having a thickness of 12 μm was laminated on the silicone rubber layer thus obtained to produce a dry presensitized plate for use in making a a dry lithographic pringing plate.

A positive transparency was overlaid on the dry presensitized plate, and was vacuum-contacted to the plate. The plate was then exposed to light using FT261V UDNS ULTRA-PLUS FLIP-TOP PLATE MAKER made by Nuarc, Ltd. for 30 counts, and the laminated film was then peeled off. The plate was dipped in a developer comprising Isopar H (Esso Chemical, Ltd.) 90 parts by weight, diethylene glycol monobutyl ether 7 parts by weight, diethylene glycol monoethyl ether 3 parts by weight, and diethyl succinate 5 parts by weight for one minute, and was rubbed by a developing pad slightly to remove the light sensitive layer and the silicone rubber layer in unexposed areas. A dry lithographic printing plate was thus obtained.

The correcting solution having the following components was applied to the pinholes, scratches, damages due to film edge produced on the developed printing plate and solid image portions using a brush, and was left to stand for ten minutes at room temperature to finish hardening.

The coating after hardening was resistant to peeling off by the correcting shear generated at the time of printing. More than 50,000 good prints were produced.

| Correcting Retouching solution | amount (parts by weight) |
|---|---|
| $(CH_3O)_3Si-(OSi(CH_3)_2)_{700}-OSi(OCH_3)_3$ | 100 |
| Tetrabutyl titanate | 1 |
| n-Hexane | 450 |
| n-Heptane | 450 |

COMPARATIVE EXAMPLE 1

A developed printing plate was prepared in the same manner as in Example 1. The following correcting solution comprising the silicone rubber composition was applied to solid image portions of the printing plate using a brush, and was left to stand at room temperature for ten minutes to complete hardening.

| Correcting Retouching Solution | amount (parts by weight) |
|---|---|
| Dimethyl polysiloxane having hydroxyl groups at both terminal ends of the molecular chain (viscosity is 1500 cps (at 25° C.) | 100 |
| Vinyl tri(isopropenyloxy)silane | 4 |
| $[(CH_3)_2N]_2C=N-C_3H_6Si(OCH_3)_3$ | 1 |
| 3-aminopropyl triethoxysilane | 1.2 |
| Humed silica having a specific surface area of 200 $m^2$/g | 8 |

As a result of printing, the silicone rubber of the corrected portion was peeled off except the especially thick coated portion when 50,000 sheets were printed.

EXAMPLE 2

Positive working dry presensitized lithographic printing plate TAP (made by TORAY) was imagewise exposed to light. Then, the silicone rubber layer of the image portions was removed using gauze while dipping it in n-heptane to obtain a dry printing plate. The same correcting solution as used in Example 1 was applied to the solid image portions of the printing plate with a brush and was left to stand at room temperature for ten minutes to complete hardening.

The coating after hardening was resistant to peeling at the time of printing, and the printing plate provided more than 50,000 good prints.

COMPARATIVE EXAMPLE 2

The correcting solution having the following components was applied to the solid image portions of the developed printing plate obtained in the same manner as in Example 2 using a brush and was left to stand at room temperature for ten minutes to complete hardening.

As a result of printing, silicone rubber of the correcting portion was peeled off except the especially thick coated portions when 50,000 sheets were printed.

| Correcting Solution | amount (parts by weight) |
|---|---|
| Dimethyl polysiloxane (having OH groups at terminal ends, number average molecular weight is about 20,000) | 100 |
| Methyl triacetoxy silane | 20 |
| Dibutyltin octanoate | 7 |
| n-Heptane | 1000 |

EXAMPLE 3

The following primer composition was applied to the surface of a smooth aluminum plate which had been degreased in a usual manner so that the amount of the composition coated was 8.0 g/m$^2$ (on dry basis) and was heated at 120° C. for three minutes and dried.

| Primer Composition | amount (parts by weight) |
|---|---|
| Photographic Gelatine #680 (made by Nitta Gelatine, Ltd.) | 100 |
| Dispersion comprising $TiO_2$: 30% by weight/ photographic gelatine #680: 3% by weight/ pure water: 67% by weight | 20 |
| Tartrazine (yellow dye) | 2 |
| 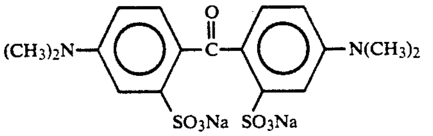 | 2 |

The following hardening agent was applied to the surface of the primer layer thus obtained so that the amount of the agent coated was 1.04 g/m$^2$ (on dry basis) and heated for one minute at 100° C., dried to harden the gelatine membrane.

| Hardening Agent | amount (parts by weight) |
|---|---|
| $CH_2{=}CHSO_2CH_2CH(OH)CH_2SO_2CH{=}CH_2$ | 2 |
| Methyl alcohol | 70 |
| Pure water | 30 |

After the primer layer was dried and hardened, it was left to stand for one day at about 20° C. The following light-sensitive composition was applied to the surface of the primer layer so that the amount of the composition coated was 1.0 g/m$^2$ (on dry basis), and dried.

| Light-sensitive composition | amount (parts by weight) |
|---|---|
| Copolymer of allyl methacrylate and sodium methacrylate (sodium methacrylate content: 15 mol %) | 100 |
| Epoxyacrylate monomer of $HOCH(CH_2OCH_2CHOHCH_2OCOCH{=}CH_2)_2$ | 30 |

-continued

| Light-sensitive composition | amount (parts by weight) |
|---|---|
| 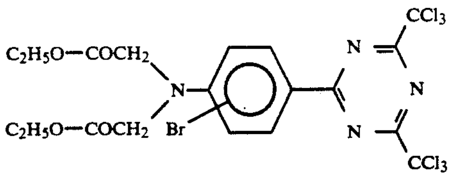 | 10 |
| Defensor MCF323 (made by Dainippon Ink and Chemical Industries, Ltd.) | 10 |
| Methyl ethyl ketone | 350 |
| Propylene glycol monomethylether | 330 |

The following silicone rubber composition was applied to the surface of the light-sensitive layer so that the amount of the composition coated was 1.7 g/m$^2$ (on dry basis), and dried to obtain a silicone rubber vulcanized layer.

| Silicone rubber composition | amount (parts by weight) |
|---|---|
| Dimethyl polysiloxane having vinyl groups at both terminal ends (M.W.: about 35,000) | 100 |
| Methylhydrogen polysiloxane having trimethyl silyl groups at both terminal ends (M.W.: about 2,500) | 3 |
| Olefin-chloroplatinate catalyst (10% toluene solution) | 2 |
| Isopar G (made by Esso Chemical, Ltd.) | 1800 |

A single-side matted PET film having a thickness of 6.5 μm was laminated on the surface of the silicone rubber layer thus obtained to form a dry presensitized plate.

A positive transparency was overlaid on the surface of the dry presensitized plate thus obtained and was intimately contacted and was imagewise exposed to light using a usual vacuum frame. The laminated film was then peeled off.

The silicone rubber layer and the light-sensitive layer in image portions were rubbed off using gauze while the dry presensitized plate was dipping in a developer having the following composition to obtain a dry lithographic printing plate.

| Developing Solution | amount (parts by weight) |
|---|---|
| Benzyl alcohol | 8 |
| New Coal B4SN (made by Nippon Emulsifying Agnets, Ltd.) | 9 |
| | 60% by weight solution |
| 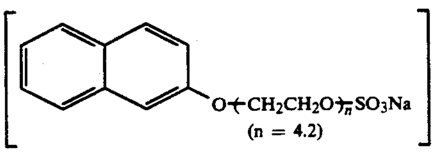 | |
| Triethanol amine | 1 |

-continued

| Developing Solution | amount (parts by weight) |
|---|---|
| Pure Water | 82 |

The correcting solution having the following composition was applied to the solid image portion of the printing plate using a brush and left to stand at room temperature for ten minutes to complete hardening.

The coating after hardening was resistant to peeling. More than 50,000 good prints were produced.

| Plate Surface Retouching Solution | amount (parts by weight) |
|---|---|
| $(CH_3O)Si—(OSi(CH_3)_2)_{500}—OSi(OCH_3)_3$ | 100 |
| Tetrabutyl titanate | 1 |
| n-Heptane | 500 |

What is claimed is:

1. A process of correcting a dry lithographic printing plate which comprises applying to an unwanted area of an ink-accepting area in the dry lithographic printing plate consisting of ink-repellent areas comprising a silicone rubber layer and ink-accepting areas, a correcting solution comprising the following components:

| | | amount (parts by weight) |
|---|---|---|
| (a) | Linear organopolysiloxane having three alkoxy groups at both terminal ends | 100 |
| (b) | Titanium based condensation catalyst | 0.1 to 5 |
| (c) | Organic solvent | 100 to 5,000 |

2. A process of correcting a dry lithographic printing plate of claim 1 wherein the components (a) is represented by the general formula (I)

$$(R^1O)_3Si—(OSi(R^2)_2)_n—OSi(OR^1)_3 \quad (I)$$

wherein $R^1$ represents a methyl, ethyl or propyl group; $R^2$ represents a monovalent hydrocarbon group having 1 to 10 carbon atoms; and n is a number of from 50 to 1,000.

3. A process of correcting a dry lithographic printing plate of claim 2 wherein $R^1$ and $R^2$ represents methyl groups.

4. A process of correcting a dry lithographic printing plate of claim 1 wherein the component (b) is tetrabutyl titanate, tetra 2-ethylhexyl titanate, triethanolamine titanate or tetraisopropenyloxy titanate.

5. A process of correcting a dry lithographic printing plate of claim 1 wherein the component (c) is n-hexane, n-heptane, ethyl acetate, mineral spirits, toluene or xylene.

* * * * *